(12) United States Patent
Krikorian et al.

(10) Patent No.: US 6,646,602 B2
(45) Date of Patent: Nov. 11, 2003

(54) TECHNIQUE FOR ROBUST CHARACTERIZATION OF WEAK RF EMITTERS AND ACCURATE TIME DIFFERENCE OF ARRIVAL ESTIMATION FOR PASSIVE RANGING OF RF EMITTERS

(75) Inventors: Kapriel V. Krikorian, Oak Park, CA (US); Robert A. Rosen, Simi Valley, CA (US)

(73) Assignee: Raytheon Company, Lexington, MA (US)

( * ) Notice: Subject to any disclaimer, the term of this patent is extended or adjusted under 35 U.S.C. 154(b) by 39 days.

(21) Appl. No.: 10/091,197

(22) Filed: Mar. 5, 2002

(65) Prior Publication Data

US 2003/0169202 A1 Sep. 11, 2003

(51) Int. Cl.[7] ................................................. G01S 5/02
(52) U.S. Cl. ..................................................... 342/430
(58) Field of Search .............................. 342/430, 450, 342/457; 455/456, 457

(56) References Cited

U.S. PATENT DOCUMENTS 3,996,590 A * 12/1976 Hammack ................ 343/112 R
5,402,347 A * 3/1995 McBurney et al. ......... 364/443
5,784,339 A * 7/1998 Woodsum et al. .......... 367/134

* cited by examiner

Primary Examiner—Dao Phan
(74) Attorney, Agent, or Firm—Leonard A. Alkov; Glenn H. Lenzen, Jr.

(57) ABSTRACT

A system for locating the position of an emitter emitting a signal having time domain features is described. At least two platforms are used. Both have a receiver for detecting the emitter signal, an FFT channelizer to act as a bandpass filter for extracting the time domain features from the emitter signal, and a thresholder for thresholding the time domain signal. An FFT transform and a correlator using templates further extract frequency domain markers identifying the emitter.

The frequency domain markers identifying the emitter are transmitted between platforms using a wireless link increasing the probability of detection of the emitter at all platforms.

30 Claims, 6 Drawing Sheets

TECHNIQUE FOR ROBUST CHARACTERIZATION OF WEAK RF EMITTERS AND ACCURATE TIME DIFFERENCE OF ARRIVAL ESTIMATION FOR PASSIVE RANGING OF RF EMITTERS

BACKGROUND OF THE INVENTION

1. Field of Invention

This invention relates to the field of passive radio frequency (RF) signal emitter ranging using a plurality of emitter signal detecting platforms extracting and exchanging information about RF signal features from said RF signal emitter.

2. Description of the Related Art

Robust radio emitter passive ranging requires a precise measurement of the time of arrival of features of an RF emitter signal to two or more detecting platforms. A high signal to noise ratio at (at least) two detecting platforms for the features of the emitter signal are generally required for a robust estimation of (ambiguous) range. Historically, the signal waveform of an emitter is estimated by assuming cyclostationary features. These features are derived from time consuming examination of assumed time domain features in likely portions of the electromagnetic spectrum. The time domain features of the signal to be examined include various parameters such as bandwidth of the signal, its location within the operating spectrum, peak pulse shape, rise times or some other defining, time marking artifact. When examined in the frequency domain, these features transform into markers that can be used to identify the signal.

The signal may be present in a unknown form, within a narrow portion of the spectrum and present a relatively low signal to noise ratio at the receiving platform. Thus, detection implies a time consuming process of searching for signal features using narrow detection bandwidths. With marginal signal to noise ratio, uncertainty mounts as to the detection of the signal and as to its features. Consequently, it is desired to minimize the time for robust detection of an emitter presenting low signal to noise ratio to a plurality of platforms cooperatively interconnected for the detection of said emitter.

SUMMARY OF THE INVENTION

A system and method for locating the position of an emitter is described. The emitter emits a cyclostationary signal having time domain features and noise, in an operating band within a first frequency range. The system comprises a first platform having a first motion. The first platform is located at a first range from the emitter, and a second platform having a second motion, is located at a second range from the same emitter.

Typical platforms, part of the system, such as the first and second platform, have tunable bandpass means, such as a bandpass filter, or FFT channelizer, for detecting the cyclostationary signal within the operating band. The tunable bandpass means extracts the time domain features and noise from the cyclostationary signal to obtain a result.

The tunable bandpass means for detecting time domain features of the cyclostationary signal, for example, comprises an antenna coupled to a downconverter having an analog output; the analog output is presented to an analog to digital converter for digitizing said analog output to a digital format. The digital format is presented to an FFT channelizer. The FFT channelizer implements a plurality of bandpass filters. The channelizer generates a result, a sequence of digital words representative of the output from the bandpass filters.

The result from the channelizer is thresholded to reduce noise thus generating a second result. The second result comprises digital words. The thresholding function compares each of the digital words generated by the channelizer to a digital threshold, for example, the lowest significant 2 bits. The threshold is computed adaptively. If a particular digital word is less than the threshold, then the digital word is set to zero. Conversely, when the digital word is more than the digital threshold, it is left unchanged.

An FFT is used for transforming the thresholded second result to the frequency domain. One or more templates indicative of known emitter features are correlated with the output of the FFT. This correlation generates a series of frequency domain markers showing where in the frequency domain an overlap exists between the template and the actual received signal.

The frequency domain markers are used for (ambiguously) computing the first range.

A transmitter is used for transmitting the frequency domain markers to the second platform using a wireless link. The second platform receives the frequency domain markers from the first platform. The wireless link operates within a second frequency range. This second frequency range is separate and distinct from the first frequency range.

The frequency domain markers detected by the first platform are used to enhance detection of the emitter, its cyclostationary signal, and the time domain features and noise at the second platform.

The second platform has the means for extracting frequency domain markers from the emitter's cyclostationary signal, and is identical to to the means used by the first platform. As with the first platform, the second platform has means for computing its (second)(ambiguous) range to the emitter. Like the first platform, it transmits its results, such as the second range, using the wireless link, to all members of the system sharing the wireless link, such as the first platform.

The motion, that is position, velocity and acceleration of the first platform is computed using a Kalman filter updated from motion data supplied from accelerometers located on the first platform at time intervals. The length of the time intervals is determined by the level of accuracy desired. Every 1 msec is typical.

Similarly, the second motion of said second platform is computed using a second Kalman filter on board the second platform, and is updated from motion data supplied from second accelerometers located on the second platform at time intervals.

Another aspect of the system is the computation of a confidence factor indicative of the ratio of the noise to the time domain features of said cyclostationary signal presented to a platform by an emitter. This confidence factor transmitted to other platforms using the wireless link. This signal to noise calculation gives an idea of the quality of the detection using a particular template.

The information carried by the wireless link is used to enhance the detection of a signal at other platforms. Upon receiving frequency domain markers detected at the first platform and transmitted to the second platform, the second platform adjusts its templates in response to the received frequency domain markers, and in response to its second motion and changes in its range with respect to the emitter. This reduces the need to try various templates corresponding to time domain features at the second platform.

DETAILED DESCRIPTION

Figure 1:
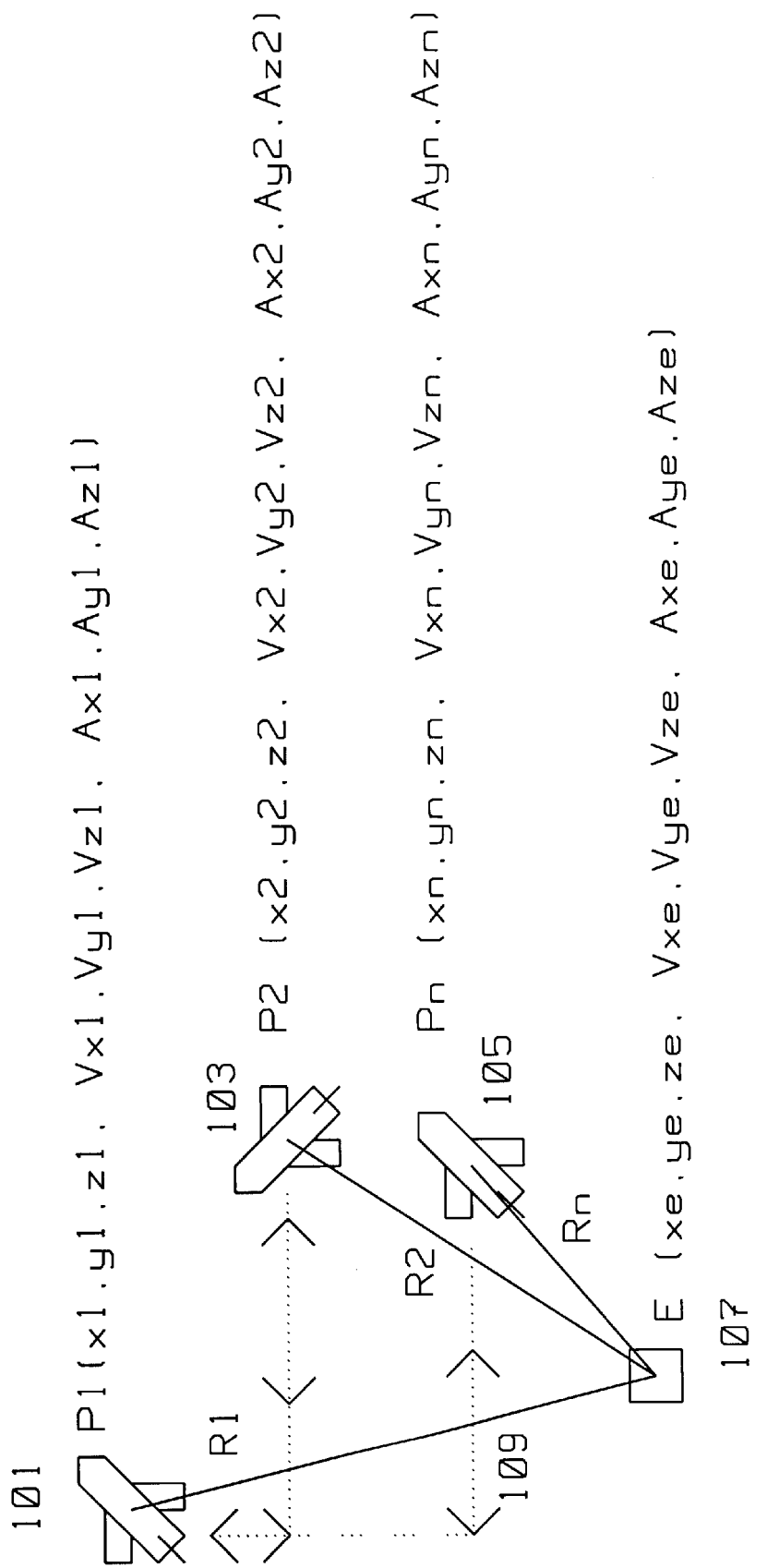
FIG. 1 is an example of the geometry of $P_1, P_2, \ldots P_n$ moving platforms cooperatively ranging a radio emitter E.

FIG. 1 shows ranging of emitter 107, E by platforms 101, 103, 105, $P_1, P_2, \ldots P_n$, located in an orthogonal Cartesian coordinate system x, y, z. Platform 101, $P_1$, is located at $x_1$, $y_1$, $z_1$, moving with velocity $V_{x1}, V_{y1}, V_{z1}$ and acceleration $A_{x1}, A_{y1}, A_{z1}$, spaced from emitter 107, E, by distance $R_1$. Similarly, platform 103, $P_2$, has a range $R_2$ from E, while other platforms, such as 105, $P_n$, have a range $R_n$ from E. It is the objective of this invention to facilitate measurement of range to emitter E from each platform, thus triangulating on E's position. From basic geometry, the range $R_1$ at time $t_0$ between $P_1$ and E is given by $$R_1(0) = \sqrt{x_{1-xe)^2+(y_{1-ye)+(z_{...}}}} \quad (1)$$

Range $R_1$ is changing as a function of time t in response to both $P_1$ platform and E emitter motion:

$$R_1(t)^2 = R_1(0)^2 + [(V_{x1} - V_{xe})t]^2 + [(V_{y1} - V_{ye})t]^2 + [(V_{z1} - V_{ze})t]^2 + \left[\frac{(A_{x1}-A_{xe})t^2}{2}\right]^2 + \left[\frac{(A_{y1}-A_{ye})t^2}{2}\right]^2 + \left[\frac{(A_{z1}-A_{ze})t^2}{2}\right]^2 \quad (2)$$

Each platform, 101, 103, 105, $P_1, P_2 \ldots P_n$, estimates respective (ambiguous) ranges $R_1, R_2 \ldots R_n$ to emitter E. Estimates from two platforms are triangulated to determine E emitter position in the case where the $z_e$ component location of E is known, as in the case of a ground based emitter.

The position of platforms within the local coordinate system x, y, z for each platform 101, 103, 105, $P_1 \ldots P_n$, is accurately known and coordinated with the electronic measurement of range to emitter E. A Kalman filter is used to combine motion information from various sources of position, velocity and acceleration measurement within each platform 101, 103, 105. The output of the Kalman filter within each platform is the exact position of the platform with respect to its coordinate system at a point in time. Sequential position, velocity and acceleration information input into the Kalman filter within each platform is received from, for example, Ground Positioning Satellites (GPS), Differential GPS, on-board inertial navigation system local to each platform $P_1 \ldots P_n$, and accelerometers coupled to the platform itself and/or to a receiving ECM antenna receiving the signal from the subject emitter, part of the platform. The implementation of Kalman filters for the prediction and smoothing of motion information is discussed in *Introduction to Sequential Smoothing and Prediction* by N. Morrison, McGraw Hill 1969, as well as *Applied Optimal Control* by A. E. Bryson and Y. C. Ho, Ginn and Co, 1969, incorporated herein by reference in their entirety.

Bidirectional wireless link 109 connects platforms 101, 103, 105, $P_1 \ldots P_n$ using receiver/transmitters on each platform. Link 109 provides a bi-directional data path for the exchange of various parameters among all platforms 101, 103, 105, $P_1 \ldots P_n$. For example, among other parameters, the data transmitted in one packet, during a time interval allocated to it, from one particular platform, for example $P_1$, 101, comprises:

transmitting platform ID;

time stamped position, velocity and acceleration of platform 101, $P_1$, as generated by the Kalman filter internal to $P_1$;

time stamped range of emitter 107, E, as computed at platform 101, from its own detection means as well as from information received from other platforms such as platforms 103, 105, $P_2 \ldots P_n$;

time stamped frequency domain marker(s) extracted from features of electromagnetic emissions detected from emitter 107, E as determined within platform 101, $P_1$, along with a detection confidence factor, CF.

clock synchronization information used by platform 101, comparing its clock signal to that received from other platforms such as 103, 105, $P_2 \ldots P_n$ to synchronize on board clock within platform 101 to clocks on other platforms.

The confidence factor CF is derived from the signal to noise ratio presented by emitter E to the platform receiver. CF reports the robustness of the results of the frequency domain marker detection process and the degree of confidence that can be expected from a particular detection. CF details the quality of range measurement achieved at a particular platform based on the amplitude of detected frequency domain markers as compared to other frequency domain artifacts generated during the same process.

A high confidence factor at a particular platform indicates that the platform is receiving a relatively high signal to noise ratio signal from emitter E. Where a high noise to ratio exists, a corresponding high confidence factor is reported on wireless link 109. Each platform compares their confidence factors to the ones received from wireless link 109. The frequency domain markers associated with the highest confidence factor presented on wireless link 109 are used within each platform for subsequent emitter ranging. Thus, all platforms access the best information (highest signal to noise ratio) available among a plurality of platforms sharing wireless link 109.

The digital data present on the bidirectional wireless link 109 is encrypted for security. Data redundancy is used to decrease the error rate and/or reduce the signal to noise ratio required for transmission detection. For example, DES encryption as well as an error correcting code is used to insure data integrity. DES encryption methods for communications links are detailed in *Applied Cryptography* by Bruce Schneier, John Wiley, 1994, incorporated herein by reference in its entirety. Data integrity is also further improved by redundant transmission.

Figure 2:
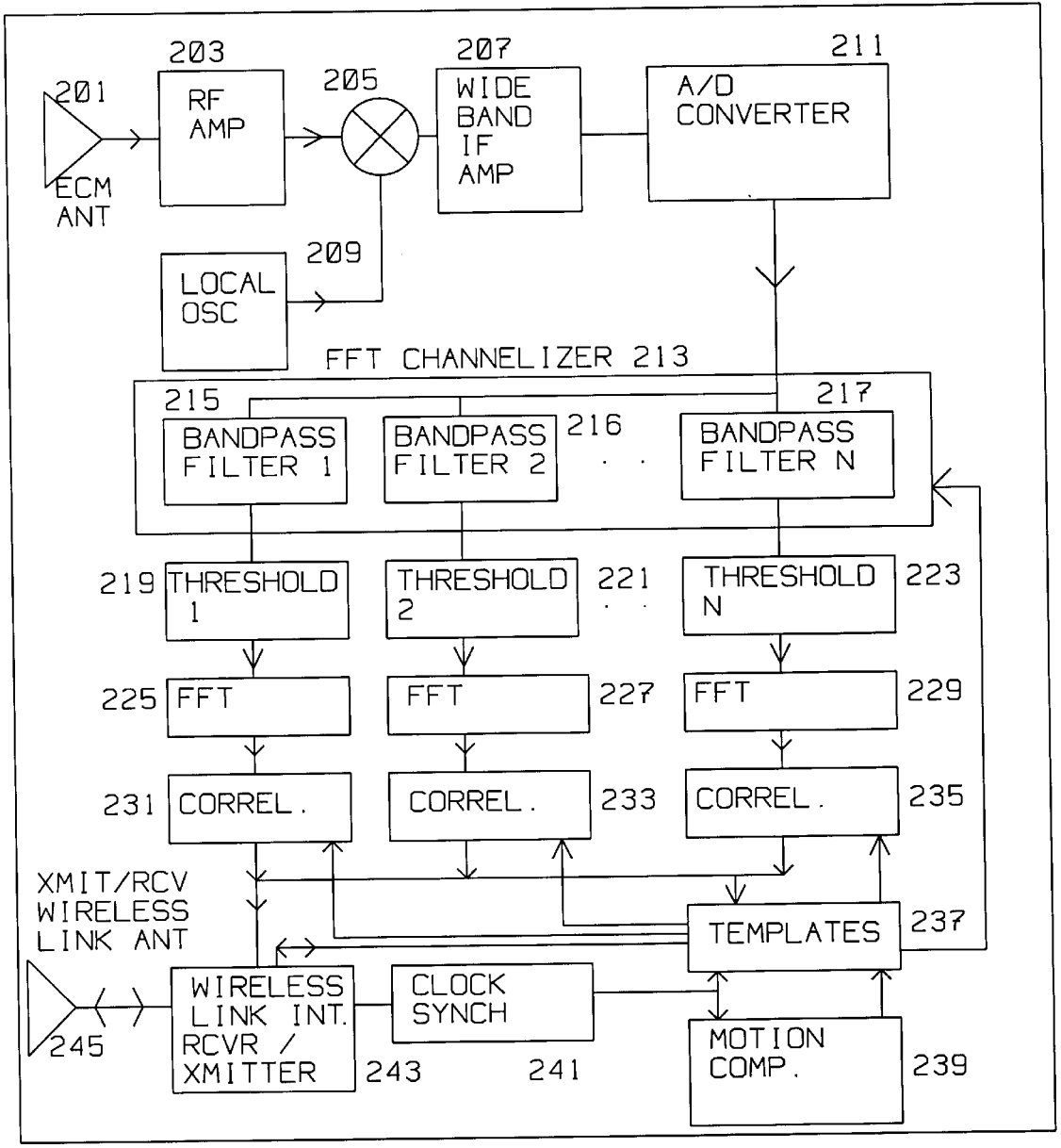
FIG. 2 is an example of the typical hardware/software structure located on each platform P.

FIG. 2 shows an overview of typical hardware/software components present on platform 200. Platform 200 is an example typical of platforms 101,103 . . . 105. The signal from the emitter to be located is received by Electronic Counter Measures (ECM) antenna 201. ECM antenna 201 is slightly directional, that is, the peak of the gain pattern is relatively broad, and may cover an azimuth angle of 10 to 30 degrees. The output of antenna 201 is amplified by broadband radio frequency amplifier 203. Local oscillator 209 output is mixed in mixer 205 to generate a sum and a difference signal from the output of amplifier 203. Wide band intermediate frequency amplifier 207 amplifies the difference signal, in turn converted by A/D converter 211. The conversion rate for A/D converter 211 is, for example, 50 Mhz. A/D converter 211 is, for example, an 8, 12, 16, or 24 bit device. Higher A/D converter resolution (for example 20 to 24 bits) is preferred for FFT channelizer 213 operation. The FFT is detailed by J. W. Cooley and J. W. Tukey, in *An algorithm for the machine calculation of Complex Fourier series*. Math Comput., Vol 19, pp 297–301, 1965. Typical FFT Channelizer operation is described by Agilent Technologies in the sales brochure for their product number E3238, option ASH.

Fast Fourier Transform (FFT) channelizer 213 performs an FFT on the digital output from A/D converter 211 to convert it into the frequency domain. Once in the frequency domain, the samples are grouped based on frequency content, and reconverted to the time domain using an inverse FFT. In effect, channelizer 213 implements a series of bandpass filters 215, 216, . . . 217, chosen around an emitter 107 frequency of interest.

Another input into channelizer 213 comes from templates unit 237. Motion compensation unit 239 sends platform position/motion information to templates 237 and emitter E frequency details obtained from frequency domain markers extracted by other platforms. Data from channelizer 213 is used to perform the search for the emitter E in the frequency domain, as described below.

Initially, before accurate ranging of E, the known position of E with respect to the detecting platform is relatively coarse, being restricted, for example, to a location defined by the directionality of antenna 201, or prior knowledge of the approximate position of E. As more platforms examine the same general location, and detect the same emitter E, more range/frequency data will cooperate to define the exact position of E, reducing the range ambiguity.

The output from each bandpass filter 215, 216, 217 from channelizer 213 is thresholded. For example, thresholding 219 examines each digital sample from bandpass filter 215. Filter 215 is typically 5 Mhz wide and tuned to a portion of the band of interest. If a particular digital sample is below a threshold value, the sample is set to zero. If the signal from bandpass filter 215 is above this threshold value, the digital value of the sample is left unchanged. Each threshold value used in 219, 221 . . . 223 is adaptively adjusted. This adaptive adjustment, for example, is done by summing 1024 digital samples output from bandpass filter 215, then dividing by 1024 (truncating 10 LSB), and subtracting one LSB (least significant bit), to identify the threshold to be used. Thus, a running average over the past 1000 digital samples changes the threshold in response to changing signal strength presented at a particular platform from emitter 107 to be ranged.

Having deleted samples below the threshold, the now relatively noise free output from thresholding 219, 221 . . . 223 is transformed via an FFT 225, 227 . . . 229 respectively into the frequency domain. The result of each FFT 225,227 . . . 229 is multiplied with a frequency domain template from template storage 237. A particular template used, for example, with output from FFT 225, is adjusted for platform motion and position as determined by motion compensation 239. The template represents certain-known or assumed characteristics of the emitter E 107 signal in the frequency domain. For example, one template may correspond to a pulsed radar signal, another to an AM radio communication transmitter.

The product of the results from FFT 225 and its respective template from 237, yields the correlation of the incoming signal from 215 with the template in the frequency domain. This correlation results in peaks and valleys indicative of frequency domain markers of emitter 107, within the band examined by filter 215, as exemplified in FIG. 6. The frequency domain marker(s) extracted by correlators 231, 233 . . . 235 is sent to the wireless link interface and receiver transmitter 243 to be transmitted via antenna 245 to the other platforms using the wireless link. In turn, these extracted frequency domain marker(s) are used at other platforms to set templates for the detection of a particular emitter E.

Wireless link antenna 245 is used to receive emitter 107 marker information from other platforms. The features are input into templates 237 for subsequent comparison with signals received from ECM antenna 201, using correlators 231, 233 . . . 235. The frequency domain markers received from other platforms are motion compensated within templates 237 with respect to motion and position computed by Kalman filter within motion compensation unit unit 239 before use by correlators 231,233 . . . 235. Another result from template 237 is to set the bandpass values within channelizer 213 in accordance with markers received from other platforms from wireless link interface 243 and antenna 245.

Correlators 231, 233, . . . 235 also generate confidence factors $CF_1$, $CF_2$ . . . $CF_n$. Each confidence factor $CF_n$ indicates how reliable the extracted feature is compared with background noise (signal to noise ratio) and/or other indicia. For example, the peak of a marker extracted by the correlation in correlator 231 is compared to the magnitude of other time domain artifacts within the same band to determine the confidence in that particular measurement for that particular band.

The calculation of each confidence factor $CF_n$ is performed by templates 237. If the confidence factor $CF_n$ is high for a particular single or plurality of detected marker(s), the detected marker(s) are transmitted to the other platforms along with the value of the particular confidence factor $CF_n$. If the confidence factor is low, as when the received signal form emitter E has low signal to noise ratio, or is non-existent, the confidence factor and the detected marker(s) are not transmitted via antenna 245, avoiding unnecessary traffic in link 109, FIG. 1.

Wireless link interface, receiver transmitter 243 transmits and receives incoming data from antenna 245, forms the proper protocol for transmission of packets using link 109 in FIG. 1, and encrypts outgoing data. Interface 243 also examines the data stream from a plurality of platforms, decodes incoming data, extracts relevant parameters and inputs them to templates 237, and clock synchronization 241. Clock synchronization 241 insures that the time base on board a particular platform is synchronized to all other platforms sharing wireless link 109.

Range computation, for example $R_1$ from platform 101 to emitter 107 (FIG. 1) is computed in templates 237 based on range information from other platforms received via antenna 245 and wireless link interface/rcvr transmitter as well as output from correlator 231, 233 . . . 235. The result of the range calculation, including ambiguities, conducted in accordance with Eq 1, is sent via wireless link interface and rcvr/xmitter 243, and antenna 245, using link 109 (FIG. 1), to other platforms.

Figure 3:
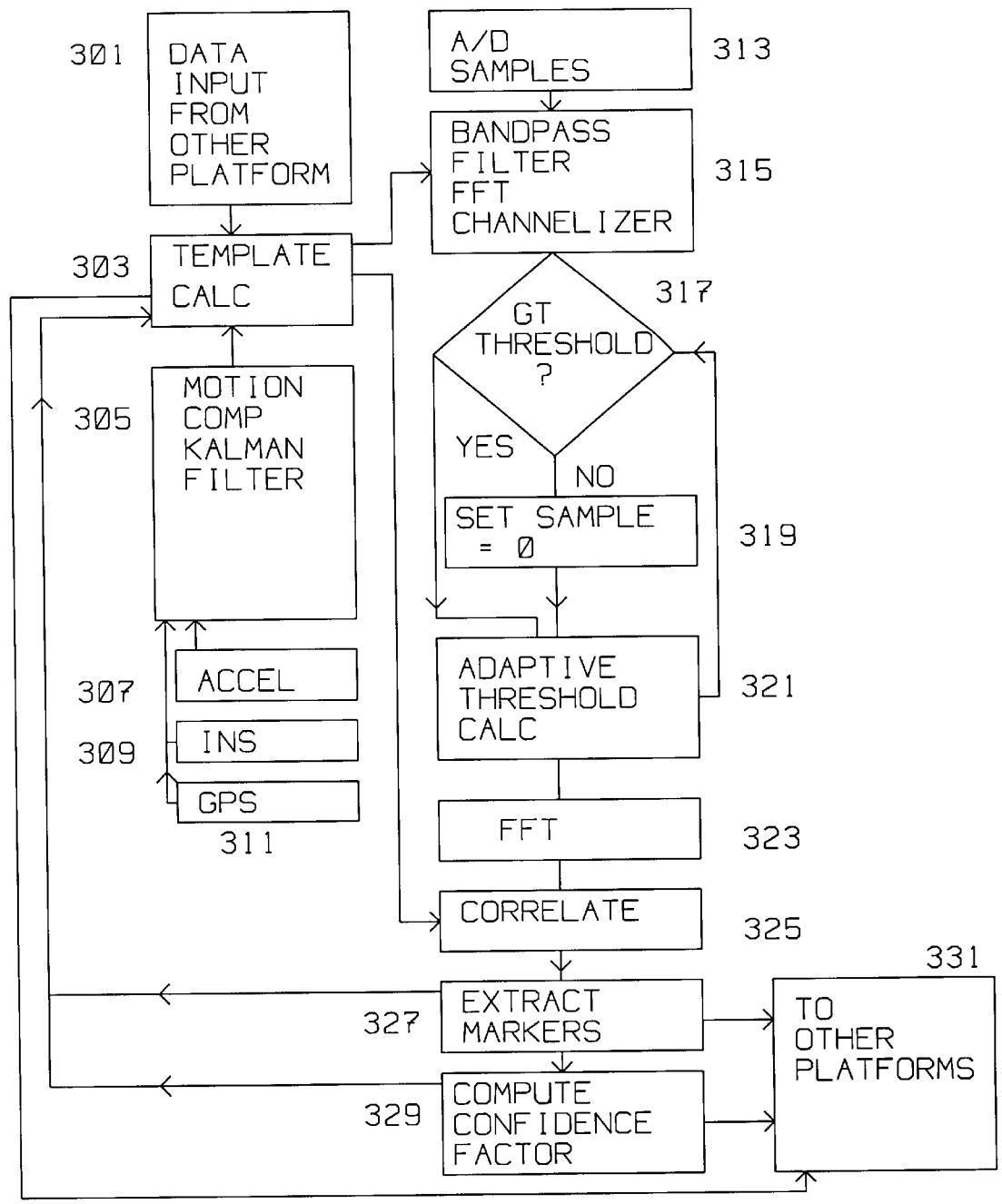
FIG. 3 are examples of details of the methods used with the hardware/software shown in FIG. 2.

FIG. 3 shows more details of the methods of operation of the present invention. In block 301, data input from other platforms (antenna 245 via wireless link interface 243 in FIG. 2) is input into template calculation 303. In one example, data from block 301 contains frequency domain marker information about a particular emitter E arriving via link 109 in FIG. 1, along with a confidence factor indicative of the quality of the features detected in a particular platform, 101., 103, . . . 105 (FIG. 1) part of the system. Depending on the value of the received confidence factor, a local operator can decide whether the marker(s) associated with the confidence factor is to be used to further refine the calculation of a template to be used at the present platform.

Another input into block 303 is motion compensation information with respect to the platform itself and range to emitter R as computed by a typical platform. This motion compensation is derived within block 305 by using a Kalman filter (located in 239, FIG. 2) updated, for example, from accelerometers 307, inertial navigation system 309 and GPS 311. Information derived from block 301, motion compensated by block 305 in block 303 is used to set the bandpass filters (215,216 . . . 217 in FIG. 2) in FFT channelizer 315 as well as to provide a platform position/motion adjusted template(s) to the correlate block 325.

Initially, when first searching for an emitter E, A/D samples are received in block 313 (generated by A/D converter 211 in FIG. 2). Each of bandpass filters (215, 216 . . . 217 in FIG. 2) in FFT channelizer 315 examine the energy content of A/D samples within a particular bandwidth as initially set by template 303. The digital output from a particular bandpass filter (either 215, or 216 or . . . 217 in FIG. 2) within channelizer 315, in the time domain, is compared to a threshold by logic block 317. Each digital sample of the digital output from 315 is examined. If a particular sample is greater than a threshold in logic block 317, the value of the digital output is left unchanged. If however, the digital sample is less than the threshold, the value of the digital output is set to zero. All digital samples after comparison are accumulated in adaptive threshold calculation 321. Here, a threshold value for the next set of digital samples is computed.

The samples modified after thresholding are transformed into the frequency domain by FFT 323. Subsequent to this, the FFT samples are multiplied with a template from template calculation 303 in correlate block 325. The results of the multiplication in correlate block 325 are examined by extract marker block 327. Frequency domain markers are extracted by tabulating significant peaks present from the results from correlate block 325. Typically, where there may not be an emitter E in a particular band examined by the bandpass filter in channelizer 315, there will be few, if any, significant markers. Furthermore, with no emitter E, these markers will change from pulse to pulse, representative of noise and other details of receiver characteristics. In such cases, the lack of a dominant marker from correlate block 325 is detected by compute confidence factor block 329. Here, the higher amplitude markers are compared to to lower amplitude artifacts. For example, if the ratio of markers is higher than three times that of lower amplitude artifacts, a confidence factor of "good" is reported from compute confidence factor block 329 to template calculation 303. Typically, software compute confidence factor block 329 and extract marker 327 reside in correlator 231, 233 . . . 235 in FIG. 2.

The markers extracted by extract marker 327 are also sent to the other platforms 331 if the computed confidence factor is "good", using wireless radio link 109 in FIG. 1, and wireless link interface, receiver/transmitter 243 in FIG. 2.

Under normal operation, the A/D samples 313 digitize analog features of a cyclostationary signal from an emitter E. When emitter E presents a high signal to noise ratio signal within the bandpass filter set in bandpass filter/FFT channelizer 315, after thresholding in 317 and 319, and correlating in 325, extract features 327 will send frequency domain markers to other platforms 331, as well as template calculation 303. Also, for a high signal to noise condition, a "good" confidence factor will be sent to other platforms 331, using link 109 in FIG. 1, as well as template calculation 303. Template calculation 303 provides the criteria to be used for particular bandwidth within compute confidence factor 329 to declare a particular detected feature "good" for the identification of an emitter E.

One aspect of the extract features 327 is to detect the repetition interval (PRI) of cyclostationary signals. That is, for a train of received cyclostationary signals, an analog feature, such as a peak, or a fast rise time, will be extracted at a particular position in the spectrum generated by FFT 323 and correlate 325 as a frequency domain marker. The spacing between these peaks determines the PRI, as exemplified in FIG. 6.

Once the PRI is determined, then template calculation 303 generates a correlation template to be used within correlate function 325. Knowledge of the PRI, facilitates the phasing of the waveform detected in the received A/D samples 313.

Figure 4:
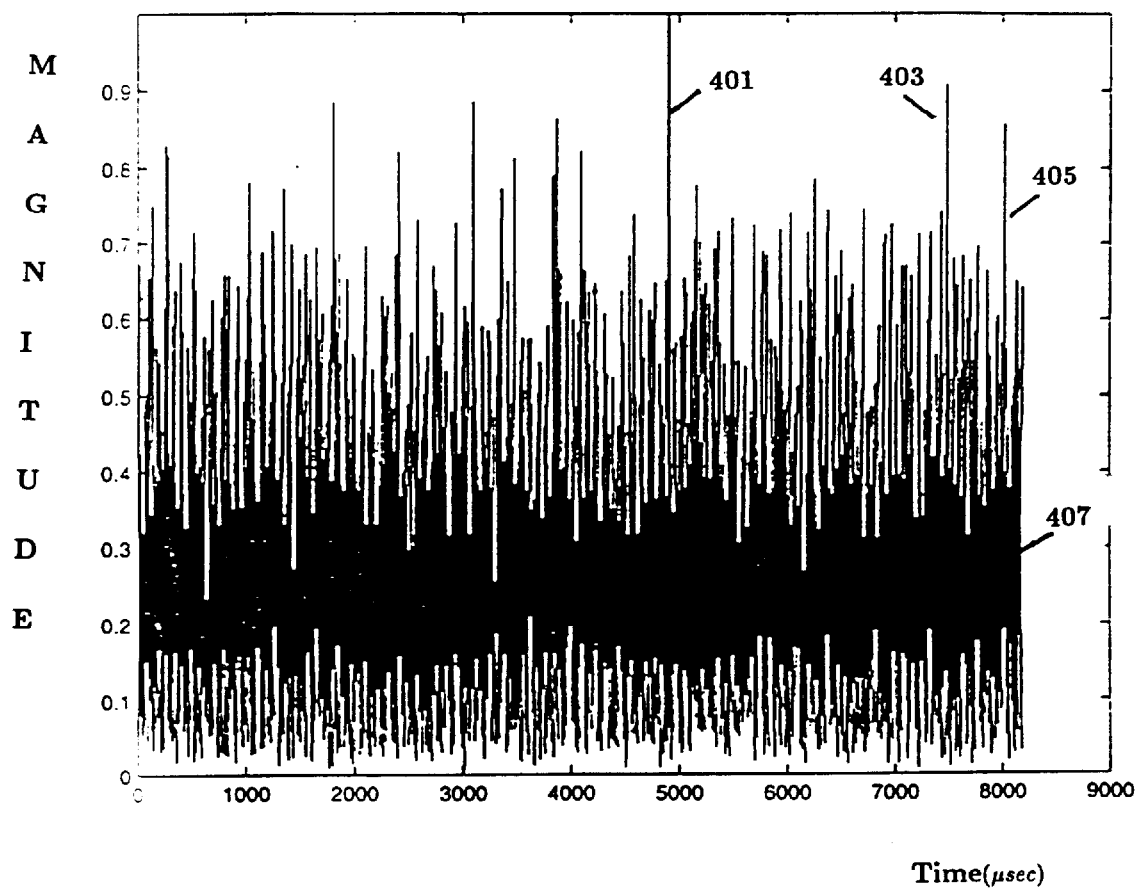
FIG. 4 is the amplitude vs time domain output of a single channel of an FFT channelizer resulting from inputting a sample cyclostationary signal having time domain features and noise, containing an emitter.

FIG. 4 is the amplitude vs. time domain output of a single channel of an FFT channelizer resulting from inputting a sample cyclostationary signal having time domain features and noise, containing an emitter. Features 401, 403 and 405 are part of the signal, as well as noise 407. The contribution from the emitter is not immediately apparent over noise.

Figure 5:
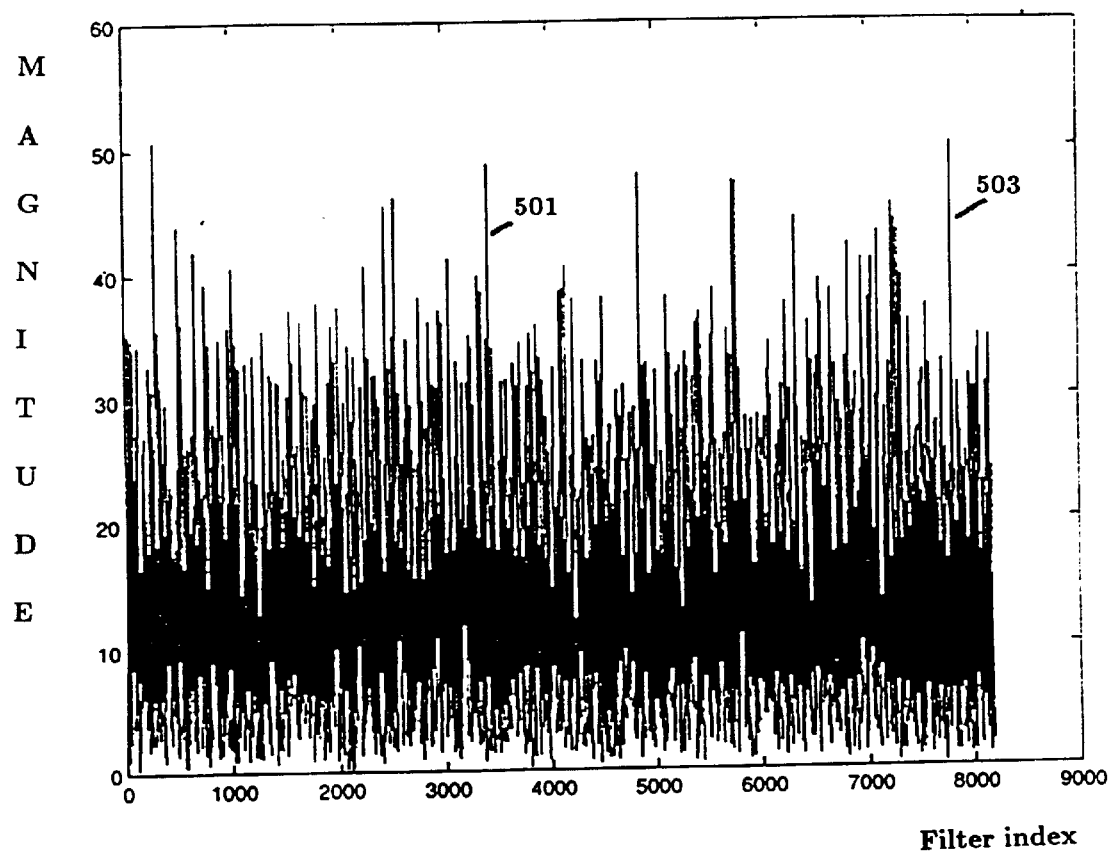
FIG. 5 shows the frequency domain transform (FFT) output of the channel data, amplitude vs filter index, displayed in FIG. 4.

FIG. 5 shows the frequency domain transform (FFT) output of the time domain features and noise of FIG. 4. The plot is amplitude vs frequency filter index of data displayed in FIG. 4. 501 and 503 are now frequency amplitudes. Again, the contribution of the emitter as compared to noise is not apparent.

Figure 6:
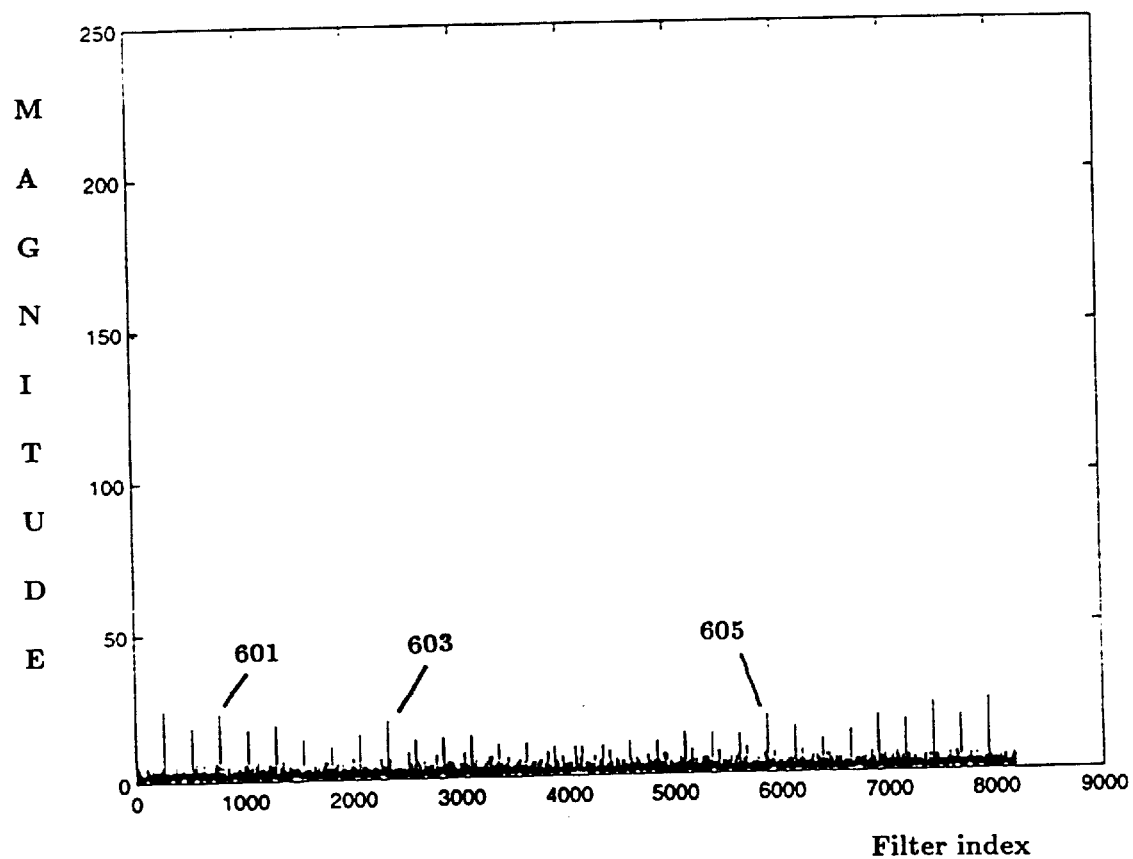
FIG. 6 shows the frequency domain markers obtained after correlating the data in FIG. 5 with a template, and thresholding of the data in FIG. 4 in accordance with this invention.

FIG. 6 shows frequency domain markers 601, 603, 605 obtained after correlating the data in FIG. 5 with a template, having thresholded the time domain data in FIG. 4 in accordance with this invention. Typically, frequency domain marker 603 is reported to the other platforms, using wireless link 109 of FIG. 1. In general, it is the peak of the correlation function that is reported to the other platforms. The signal to noise ratio of a particular frequency domain marker is also reported using link 109 to the other platforms. FIG. 6 shows an emitter having pulsed characteristics with a PRI of 258 microseconds. Triangulation on the emitter is achieved by computing the time difference of arrival of the pulse at two or more detecting platforms, where the position of the platforms is well known.

All references cited in this document are incorporated herein in their entirety.

Although presented in exemplary fashion employing specific embodiments, the disclosed structures are not intended to be so limited. For example, instead of the typical FFT used to transform from the time domain to the frequency domain, a polyphase FFT, a discrete Fourier transform (DFT), or other tools can be used. Instead of DES encryption, a later encryption version method using a key of more than the typical 56 bits can be applied, or only encryption of a portion of the typical data packet can be used.

While a local oscillator 209 and mixer 205 are shown to extract an intermediate frequency, the same function can be achieved by direct A/D conversion of the output of RF amplifier 203 and subsequent application of a higher performance FFT channelizer.

The example of an adaptive threshold in 317, 319 and 321 is given, but other types of low pass filters can be used to arrive at a similar, envisioned result.

Those skilled in the art will also appreciate that numerous changes and modifications could be made to the embodiment described herein without departing in any way from the invention. These changes and modifications and all obvious variations of the disclosed embodiment are intended to be embraced by the claims to the limits set by law.

We claim:

1. A system for locating the position of an emitter, said emitter emitting a cyclostationary signal having time domain features and noise, said cyclostationary signal occupying a band within a first frequency range, said system comprising:

a first platform having a first motion, said first platform located at a first range from said emitter, and a second platform having a second motion, said second platform located at a second range from said emitter, said first platform having tunable bandpass means for detecting said cyclostationary signal within said band, said band within said first frequency range, said tunable bandpass means extracting said time domain features and noise from said cyclostationary signal to obtain a result;

means for thresholding said result to reduce said noise thus generating a second result;

means for extracting frequency domain markers from said second result using one or more templates;

means for computing said first range from said frequency domain markers;

means for transmitting said frequency domain markers to said second platform using a wireless link, said second platform having means for receiving said frequency domain markers from said first platform using said wireless link, said wireless link operating within a second frequency range, said second frequency range separate and distinct from said first frequency range; and means at said second platform for using said frequency domain markers detected by said first platform to enhance detection of said cyclostationary signal and said time domain features and noise at said second platform.

2. A system as described in claim 1 wherein said second platform comprises:

second means for extracting said frequency domain markers from said cyclostationary signal;

second means for computing said second range to said emitter; and second means for transmitting said second range to said first platform using said wireless link.

3. A system as described in claim 1 wherein said tunable bandpass means for detecting said time domain features of said cyclostationary signal comprises:

an antenna coupled to a downconverter having an analog output; said analog output presented to an analog to digital converter for digitizing said analog output to a digital format, said digital format presented to an FFT channelizer;

said FFT channelizer implementing a bandpass filter, said channelizer generating a sequence of digital words.

4. A system as described in claim 1 wherein said result comprises digital words, and said means for thresholding compares each of said digital words to a digital threshold, said digital words set to zero when said digital words is less than said digital threshold and unchanged when larger than said threshold.

5. A system as described in claim 1 wherein said first motion of said first platform is computed using a Kalman filter updated from motion data supplied from accelerometers located on said first platform at time intervals.

6. A system as described in claim 1 wherein said second motion of said second platform is computed using a second Kalman filter updated from motion data supplied from second accelerometers located on said second platform at time intervals.

7. A system as described in claim 1 wherein said means for extracting frequency domain markers from said time domain features and noise has computing means for computing a confidence factor indicative of a ratio of said noise to said time domain features of said cyclostationary signal presented to said first platform by said emitter, said confidence factor transmitted to said second platform using said wireless link.

8. A system as described in claim 1 wherein said second platform has means to adjust said frequency domain markers detected at said first platform and transmitted to said second platform in response to said second motion and changes in said second range of said second platform with respect to said emitter to enhance reception of said time domain features at said second platform.

9. A system for locating the position of an emitter, said emitter emitting a cyclostationary signal having time domain features and noise, said cyclostationary signal occupying a band within a first frequency range, said system comprising:

a first platform having a first motion, said first platform located at a first range from said emitter, and a second platform having a second motion, said second platform located at a second range from said emitter, said first platform having a first tunable bandpass filter tuned for detecting said cyclostationary signal within said band, said band within said first frequency range, said first tunable bandpass filter extracting said time domain features and noise from said cyclostationary signal;

fast Fourier transform for extracting frequency components from said time domain features and noise from said cyclostationary signal extracted by said bandpass filter;

correlator for multiplying one or more first templates with said frequency components from said fast Fourier transform for obtaining frequency domain markers;

computer for computing said first range from said frequency domain markers;

transmitter for transmitting said frequency domain markers to said second platform using a wireless link, said second platform having a receiver for receiving said frequency domain markers from said first platform using said wireless link, said wireless link operating within a second frequency range, said second frequency range separate and distinct from said first frequency range;

second tunable bandpass filter at said second platform tuned using said frequency domain markers detected by said first platform for the detection of said cyclostationary signal and said time domain features and noise at said second platform; and template adjuster at said second platform for generating second templates in response to said frequency domain markers at said second platform.

10. A system as described in claim 9 wherein said second platform comprises:

second fast Fourier transform for extracting said frequency domain markers from said cyclostationary signal;

second computer for computing said second range to said emitter; and second transmitter for transmitting said second range to said first platform using said wireless link.

11. A system as described in claim 9 wherein said tunable first bandpass filter for detecting said time domain features of said cyclostationary signal receives said cyclostationary signal from an antenna coupled to a downconverter having an analog output; said analog output presented to an analog to digital converter for digitizing said analog output to a digital format, said digital format presented to an FFT channelizer;

said FFT channelizer implementing said tunable first bandpass filter, said channelizer having a digital time domain output.

12. A system as described in claim 11 wherein said digital time domain output from said FFT channelizer are digital words, each of said digital words compared to a threshold, each of said digital words set to zero when said digital word is less than said threshold and unchanged when larger than said threshold.

13. A system as described in claim 9 wherein said first motion of said first platform is computed using a Kalman filter updated from motion data supplied from accelerometers located on said first platform at time intervals.

14. A system as described in claim 9 wherein said second motion of said second platform is computed using a second Kalman filter updated from motion data supplied from second accelerometers located on said second platform at time intervals.

15. A system as described in claim 9 wherein said correlator for extracting frequency domain markers from said time domain features and noise also computes a confidence factor indicative of a ratio of said noise to said time domain features of said cyclostationary signal presented to said first platform by said emitter, said confidence factor transmitted to said second platform using said wireless link.

16. A system as described in claim 9 wherein said second platform adjusts said frequency domain markers detected at said first platform and transmitted to said second platform in response to said second motion and said second range of said second platform with respect to said emitter.

17. A system for locating the position of an emitter, said emitter emitting a signal having features, said signal occupying a band within a first frequency range, said system comprising:

a first platform located at a first range from said emitter, and a second platform located at a second range from said emitter;

said first platform having a receiver for detecting said signal;

a bandpass filter for extracting said features from said signal within said band;

a correlator using first templates for computing markers and said first range from said features; and a transmitter for transmitting said markers to said second platform using a second frequency range, said second frequency range different from said first frequency range;

said second platform having a receiver, said receiver operating within said second frequency range for receiving said markers from said first platform, and second templates for using said markers detected by said first platform to enhance detection of said signal at said second platform.

18. A system as described in claim 17 wherein said second platform has second bandpass filters, second correlators and second computer for computing said second range to said emitter from said signal received at said second platform, and a second transmitter for transmitting said second range to said first platform using said second frequency range.

19. A system as described in claim 17 wherein said receiver for detecting said features of said signal comprises:

an antenna coupled to a downconverter having an analog output; said analog output presented to an analog to digital converter for digitizing said analog output to a digital format presented to an FFT channelizer;

said FFT channelizer implementing a bandpass filter, said channelizer having a digital time domain output;

thresholder for thresholding said digital time domain output into a result;

FFT converter for converting said result into a frequency domain answer;

correlator for correlating said frequency domain answer with a template for extracting said markers from said signal.

20. A system as described in claim 19 wherein said thresholder compares said digital time domain output to a threshold, said digital time domain output set to zero when said digital time domain output is less than said threshold and unchanged when larger than said threshold.

21. A system as described in claim 17 wherein said first platform has a Kalman filter for computing position of said first platform at time intervals.

22. A system as described in claim 17 wherein said second platform has a second Kalman filter for computing position of said second platform in time increments and a wireless link for reporting said position to said first platform.

23. A system as described in claim 17 wherein said means for extracting said features from said signal has means for computing a confidence factor indicative of a ratio of noise to said signal presented to said first platform by said emitter.

24. A system as described in claim 17 wherein said second platform has means to adjust said features detected at said first platform and transmitted to said second platform for position of said second platform with respect to said emitter.

25. A method for locating the position of an emitter, said emitter emitting a cyclostationary signal having time domain features and noise, said cyclostationary signal occupying a band within a first frequency range, said method comprising the steps of:

detecting said cyclostationary signal using a bandpass filter tuned to said band to obtain digital samples, said detecting from a first platform having a first motion, said first platform located at a first range from said emitter;

thresholding said digital samples by comparing said digital samples to a threshold, setting the digital value of said digital samples to zero for all samples below a threshold and leaving all other digital samples unchanged thus obtaining a first result;

converting said first result from the time domain to the frequency domain using an FFT thus obtaining a second result;

extracting frequency domain markers from said second result by using one or more templates correlated with said second result;

computing said first range from said frequency domain markers;

transmitting said frequency domain markers to a second platform using a wireless link, receiving said frequency domain markers at said second platform from said first platform using said wireless link, said wireless link operating within a second frequency range, said second frequency range separate and distinct from said first frequency range; and detecting of said cyclostationary signal and said time domain features and noise at said second platform using said frequency domain markers computed by said first platform.

26. A method as described in claim 25 wherein the step of detecting said cyclostationary signal further comprises:

coupling said cyclostationary signal to an antenna connected to a downconverter having an analog output;

presenting said analog output to an analog to digital converter for digitizing said analog output to a digital format, presenting said digital format presented to an FFT channelizer; said FFT channelizer implementing said bandpass filter said channelizer generating said digital samples.

27. A method as described in claim 25 further comprising the steps of computing said first motion of said first platform using a Kalman filter and updating said Kalman filter from motion data supplied from accelerometers located on said first platform at time intervals.

28. A method as described in claim 25 further comprising the steps of:

computing said second motion of said second platform using a second Kalman filter;

updating said motion from data supplied from second accelerometers located on said second platform at time intervals.

29. A method as described in claim 25 wherein said step for extracting frequency domain markers from said second result further includes the steps of:

computing a confidence factor indicative of a ratio of said noise to said time domain features of said cyclostationary signal presented to said first platform by said emitter; and transmitting said confidence factor to said second platform using said wireless link.

30. A method as described in claim 25 including the step of adjusting said frequency domain markers detected at said first platform and transmitted to said second platform in response to said second motion and changes in said second range of said second platform with respect to said emitter.

* * * * *